United States Patent [19]
Shimizu et al.

[11] Patent Number: 4,982,895
[45] Date of Patent: Jan. 8, 1991

[54] HEATING SYSTEM FOR AUTOMOTIVE VEHICLES

[75] Inventors: Joji Shimizu; Yuji Chujo, both of Kanagawa; Yasushi Yamamoto, Tokyo; You Noda, Kanagawa, all of Japan

[73] Assignee: Nissan Motor Company, Limited, Yokohama, Japan

[21] Appl. No.: 429,222

[22] Filed: Oct. 31, 1989

[30] Foreign Application Priority Data

Oct. 31, 1988 [JP] Japan .................. 63-276934
Oct. 31, 1988 [JP] Japan .................. 63-143285[U]
Nov. 18, 1988 [JP] Japan .................. 63-150330[U]

[51] Int. Cl.$^5$ .................................. G05D 23/00
[52] U.S. Cl. ......................... 237/2 A; 237/12.3 B; 237/12.3 A
[58] Field of Search ............ 237/2 A, 12.3 R, 12.3 A, 237/12.3 B; 165/104.11, 104.21, 104.22, 41, 42

[56] References Cited

U.S. PATENT DOCUMENTS 4,667,876 5/1987 Negishi .................. 237/2 A X

FOREIGN PATENT DOCUMENTS

59-16211 1/1984 Japan .

Primary Examiner—Henry A. Bennet
Attorney, Agent, or Firm—Foley & Lardner, Schwartz, Jeffery, Schwaab, Mack, Blumenthal & Evans

[57] ABSTRACT

A heating system for automotive vehicles comprises a heater core utilizing engine coolant, a blower disposed upstream of the heater core, and a closed-loop pipe heating system utilizing exhaust heat from exhaust gas. The pipe heating system comprises an evaporator section disposed in an exhaust gas passage, a condenser section disposed downstream of the heater core, a pipe section defining a first fluid passage from the evaporator section to the condenser section, a return pipe section defining a second fluid passage from the condenser section to the evaporator section, working fluid circulating in a fluid passage defined in the evaporator section and condenser section, and in the first and second fluid passages, sensors for monitoring whether activation of the pipe heating system is required, and flow control means disposed in the return pipe section, for controlling working fluid flow from the condenser section to the evaporator section, in response to signals from the sensors. Optimum heating control is obtained by controlling working fluid flow to the evaporator. The flow control means also operates such that all of the working fluid circulating in the pipe heating system is converged in the evaporator section when atmospheric temperature in the evaporator section is less than a predetermined temperature at which the working fluid transits from a liquid state to a gaseous state, thereby resulting in easy restarting of the system in spite winter conditions wherein the ambient air temperature is particularly low.

19 Claims, 4 Drawing Sheets

HEATING SYSTEM FOR AUTOMOTIVE VEHICLES

BACKGROUND OF THE INVENTION

1. Field of the Invention

The present invention relates to a heating system for automotive vehicles. Specifically to a system which is capable of transmitting a portion of the heat of the vehicle engine exhaust through a closed-loop heat pipe to a condenser provided downstream of and just behind a heater core.

2. Description of the Prior Disclosure

Recently, there have been proposed and developed various heating systems for automotive vehicles, utilizing exhaust heat from the engine in addition to fluid circulating in the radiator.

One such heating system has been disclosed in Japanese Utility Model First Publication (Jikkai Showa) No. 59-16211. The heating system comprises a main heating system including a heater core connected through a pair of fluid passages to an outlet of a water cooling jacket of the engine and an inlet of a water pump of the engine in such a manner as to be juxtaposed with upper and system including an evaporator section disposed in a manner so as to be in contact with an exhaust passage of the engine and a condenser section disposed downstream of and just behind the heater core. This conventional heating system also includes valve means, such as an electromagnetic valve disposed in the return heat pipe section between the evaporator and the condenser and a discharge air temperature sensor disposed downstream of the condenser, for monitoring the temperature of air flowing through the condenser. In the construction of the conventional heating system, the closed-loop pipe heating system serves as an auxiliary heating system in which sufficiently heated air may be rapidly supplied to the vehicular cabin via the above mentioned arrangement of the pipe heating system, even during engine warm-up when the temperature of radiator coolant is low. In this conventional heating system, if the signal from the air temperature sensor exceeds a predetermined value and sufficient hot water is being supplied from the radiator through the upper radiator hose to the heater core, the above mentioned valve is fully closed and as a result the recirculating flow of working fluid, such as water in the heat pipe is shut off to avoid undesirable over-heating. However, in this conventional heating system, if working fluid remains in the heat pipe section after stopping the engine on winter days or nights in which the ambient temperature is particularly low, there is a possibility that the working fluid will freeze in the heat pipe section. Under such conditions (wherein the working fluid freezes in the heat pipe section) restarting of the closed-loop pipe heating system of the heating system is difficult.

Furthermore, in the conventional heating system, even after the valve provided in the heat pipe closes, a relatively large amount of residual working fluid will remain in the evaporator section to be subsequently evaporated until on residual fluid remains in the evaporator. Thus, this evaporated fluid is supplied as steam to the condenser. Therefore, a further portion of exhaust heat is still transmitted from the evaporator to the condenser after closing the valve. This heat is further transmitter to the vehicular cabin and as a result, the vehicle occupants feel uncomfortable due to momentary over-heating. Additionally, if working fluid trapped in the evaporator section continues to generate steam after the discharge air temperature exceeds the predetermined value and the valve is fully closed, the pressure and temperature of the working fluid in the closed-loop heat pipe may become excessively high, thereby resulting in damage to the closed-loop pipe heating system.

SUMMARY OF THE INVENTION

It is therefore, in view of the above disadvantages, an object of the present invention to provide a heating system for automotive vehicles with quick response in which the closed-loop pipe heating system is easily capable of restarting in spite of particularly low winter temperatures.

It is another object of the invention to provide a heating system for automotive vehicles with quick response, which can precisely control the closed-loop pipe heating system to serve as an auxiliary heating system during engine warm-up.

It is a further object of the invention to provide a heating system for automotive vehicles which is capable of preventing excessive steam pressure and temperature build-up in the closed-loop heat pipe to prevent damage thereto.

In order to accomplish the aforementioned and other objects, a heating system for automotive vehicles comprises a heater core connected to a fluid-supplied cooling jacket of an engine through an intake fluid passage for introducing coolant from the cooling jacket to the heater core and a return fluid passage for returning the engine coolant from the heater core to the cooling jacket, a blower disposed upstream of the heater core for providing air flow through the heater core, and a closed-loop pipe heating system. The closed-loop pipe heating system comprises an evaporator section disposed in an exhaust passage for exhaust gas, for utilizing a portion of the heat included in the exhaust gas, a condenser section disposed downstream of the heater core, for transmitting exhaust heat to the air flowing through the heater core, pipe means including a pipe section defining a first fluid passage from the evaporator section to the condenser section and a return pipe section defining a second fluid passage from the condenser section to the evaporator section, working fluid means circulating in the closed-loop pipe heating system, for transmitting the portion of exhaust heat from the evaporator section to the condenser section. The closed-loop pipe heating system also includes valve means disposed in the return pipe section, for establishing or blocking flow of the working fluid means flowing through the second fluid passage, and valve control means associated with the valve means in such a manner as to fully open the valve means when atmospheric temperature in the evaporator section is less than a predetermined temperature at which the working fluid in the evaporator section transits from a liquid state to a gaseous (steam) state. The working fluid means utilizes the same fluid as the engine coolant. Preferably, the valve means includes an electromagnetic valve, while the valve control means includes a temperature sensor for monitoring atmospheric temperature in the evaporator section, outputting a signal indicating whether or not the monitored temperature is less than the predetermined temperature, to the electromagnetic valve. The valve control means may include a built-in delay timer by which the electromagnetic valve is fully opened only after a predetermined time has elapsed after the engine has stopped. The valve means may include a mechanical spool valve and the valve control means includes a capillary tube, a temperature detecting chamber connected through the capillary tube to the spool valve, disposed in such a manner as to be in contact with the evaporator section, and with any gas or liquid fluid disposed in the temperature detecting chamber, whereby the spool valve fully opens when the atmospheric temperature is less than the predetermined temperature.

According to another aspect of the invention, a heating system for automotive vehicles comprises a heater core connected to a fluid-supplied cooling jacket of an engine through an intake fluid passage for introducing coolant from the engine cooling jacket to the heater core and a return fluid passage for returning the engine coolant from the heater core to the cooling jacket, a blower disposed upstream of the heater core, for providing air flow through the heater core, and a closed-loop pipe heating system. The closed-loop pipe heating system comprises an evaporator section disposed in an exhaust passage for exhaust gas, for utilizing a portion of the heat included in the exhaust gas, a condenser section disposed downstream of the heater core, for transmitting exhaust heat to the air flowing through the heater core, a liquid tank disposed downstream of the condenser section, between the condenser and evaporator sections, pipe means including a pipe section defining a first fluid passage from the evaporator section to the condenser section and a return pipe section defining a second fluid passage from the condenser section to the evaporator section. The return pipe section includes a pipe section intercommunicating the condenser section and the liquid tank and first and second return pipe sections each intercommunicating the liquid tank and the evaporator, one end of the second return pipe section being arranged on the side wall of the liquid tank in a position higher than one end of the first return pipe section. The closed-loop pipe heating system also includes working fluid means circulating therein, for transmitting exhaust heat from the evaporator section to the condenser section. The closed-loop pipe heating system further includes first valve means disposed in the first return pipe section, for establishing or blocking flow of the working fluid means flowing through the first return pipe section, second valve means disposed in the second return pipe section, for establishing or blocking flow of the working fluid means through the second return pipe section, sensor means for monitoring whether or not the closed-loop pipe heating system (auxiliary heating system) is required and generating a signal indicative thereof, and a controller for controlling the first and second valve means in response to the signal from the sensor means. The controller controls the first and second valve means in a first mode wherein the first valve means is fully opened and the second valve means is fully closed when a relatively large amount of heat is required, a second mode wherein the first valve means is fully closed and the second valve means is fully opened when a relatively small amount of heat is required, or a third mode wherein both the first and second valve means are fully closed when no heat is required from the closed-loop pipe heating system. The controller controls the two valve means in such a manner as to fully open the first valve means and to fully close the second valve means when atmospheric temperature in the evaporator section is less than a predetermined temperature at which the working fluid means in the evaporator section transits from a liquid state to a gaseous (steam) state. Each of the first and second valve means includes an electromagnetic valve.

According to a further aspect of the invention, a heating system for automotive vehicles comprises a heater core connected to a fluid-supplied cooling jacket of an engine through an intake fluid passage for introducing coolant from the engine cooling jacket to the heater core and a return fluid passage for returning the engine coolant from the heater core to the cooling jacket, a blower disposed upstream of the heater core, for providing air flow through the heater core, a closed-loop pipe heating system. The closed-loop pipe heating system comprises an evaporator section disposed in an exhaust passage for exhaust gas, for utilizing a portion of the heat included in the exhaust gas, a condenser section disposed downstream of the heater core, for transmitting exhaust heat to the air flowing through the heater core, pipe means including a pipe section defining a first fluid passage from the evaporator section to the condenser section and a return pipe section defining a second fluid passage from the condenser section to the evaporator section, working fluid means circulating in a fluid passage defined in the evaporator section and the condenser section, and the first and second fluid passages, for transmitting exhaust heat from the evaporator section to the condenser section, sensor means for monitoring whether or not the closed-loop pipe heating system (auxiliary heating system) is required and generating a signal indicative thereof, and flow control means disposed in the second fluid passage, for controlling flow of the working fluid from the condenser section to the evaporator section, in response to the signal from the sensor means. The flow control means includes valve means disposed in the return pipe section, for establishing or blocking flow of the working fluid through the second fluid passage, pump means disposed in the return pipe section in line with the valve means, for discharging the working fluid means from the condenser section through the second fluid passage to the evaporator section, and a controller for controlling the valve means and the pump means in response to the signal from the sensor means. The valve means includes a an electromagnetic valve and the pump means includes a variable displacement pump. The flow control means operates in such a manner as to provide maximum fluid flow of the working fluid from the condenser section through the second fluid passage to the evaporator section when the atmospheric temperature in the evaporator section is less than a predetermined temperature at which the working fluid in the evaporator section transits from a liquid state to a gaseous (steam) state.

DESCRIPTION OF THE PREFERRED EMBODIMENTS

The principles of the present invention as applied to a heating system for automotive vehicles are illustrated in FIGS. 1 to 5.

Figure 1:
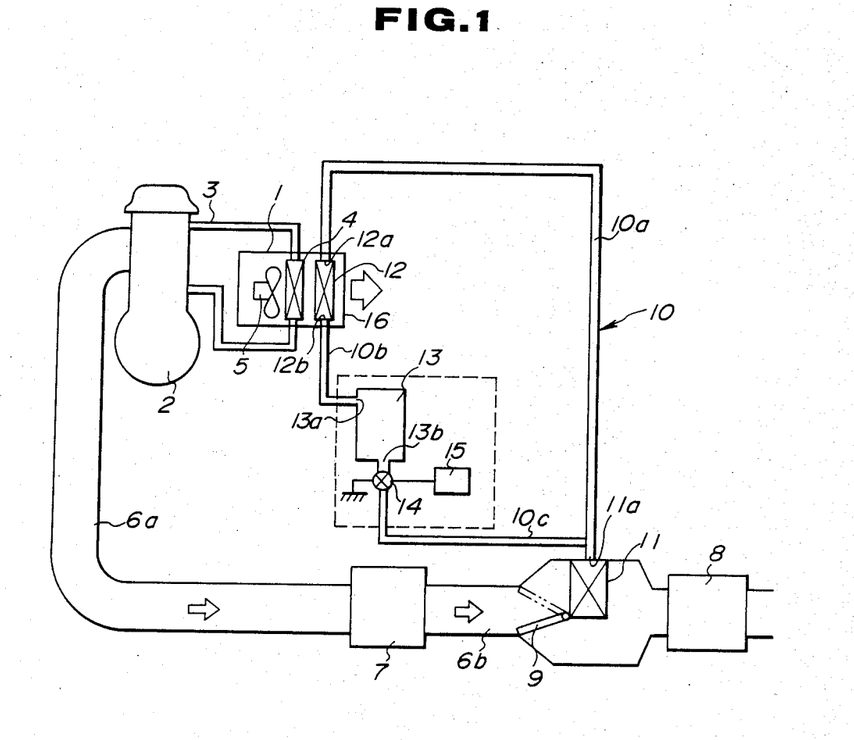
FIG. 1 is a system diagram illustrating the main components of a heating system for automotive vehicles of a first embodiment according to the invention.

In the preferred embodiments, the same reference numerals used to designate elements in the first embodiment shown in FIG. 1 will be applied to corresponding elements used in other embodiments for the purpose of comparing respective embodiments.

First Embodiment

Referring now to the drawings, particularly to FIG. 1, a heater unit 1 comprises a pair of fluid passages 3 respectively connected to an outlet of a fluid-supplied cooling jacket (not shown) of the engine 2 and an inlet of a cooling fluid pump (not shown) of the engine 2. (Water is often used as a coolant for an engine 2, because its specific heat is high compared to other fluids.) The heater unit 1 also includes a heater core 4 connected to the fluid passages 3. Reference numeral 5 denotes a blower disposed upstream of the heater core 4 to supply air flow through the heater core 4. As is generally known, when air from the blower 5 passes through the heater core 4, heat is transmitted from fluid circulating in the heater core 4 to air flowing through the heater core 4. In case of the above mentioned heater unit 1, since the engine coolant temperature is low just after the engine starts, particularly in cool climates, it takes a relatively long time for the engine coolant temperature to rise to a temperature within an optimum range for vehicle heating, (80° to 90° C., for example). For this reason, a closed-loop pipe heating system 10 is further provided so as to operate effectively as an auxiliary heating system when the engine coolant temperature is low. The looped pipe system 10 includes an evaporator section 11 provided in an intermediate exhaust pipe 6b interconnecting a catalyzer 7 and a muffler 8. The evaporator section 11 is arranged eccentrically with regard to the central axis of the intermediate exhaust pipe 6b. The evaporator 11 has an opening 11a for acting as an outlet for gaseous fluid evaporated in the evaporator 11 and acting as an inlet for liquid fluid supplied from the liquid tank 13. The catalyzer 7 is connected through an exhaust pipe 6a to the exhaust manifold of the engine 2. A switchable door 9 is provided in the intermediate exhaust pipe 6b so as to operate in either a first position (as shown in the solid line of FIG. 1) wherein all exhaust gas flowing through the catalyzer 7 is introduced via the evaporator 11 to the muffler 8 or a second position (as shown in the phantom line of FIG. 1) wherein all exhaust gas flowing through the catalyzer 7 is introduced not via the evaporator 11, but directly to the muffler 8. The switchable door 9 is generally actuated by means of an actuator (not shown) which is controlled by a controller (not shown) such that the door 9 is actuated in the first position during all operating states of the engine except full throttle and is actuated in the second position to avoid lowering engine performance during the full throttle state of the engine, in which the exhaust gas temperature is extremely high, for example 600° C. The closed-loop pipe heating system 10 also includes a condenser 12 disposed downstream of and in the vicinity of the heater core 4.

Figure 2A:
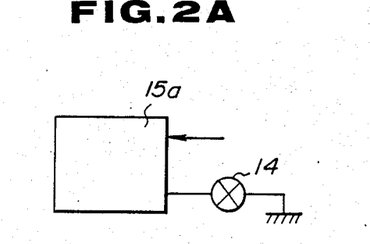
FIGS. 2A, 2B, and 2C are block diagrams illustrating preferred embodiments of a valve control device for the closed-loop heat pipe of the heating system of the first embodiment.
Figure 2B:
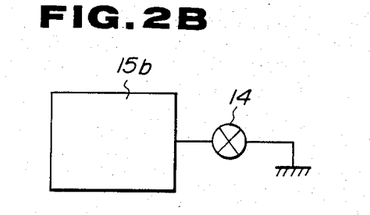
Figure 2C:
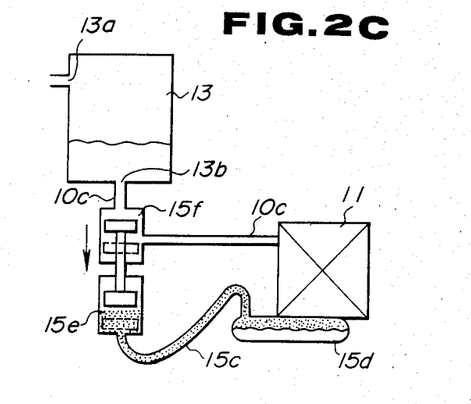

The closed-loop pipe heating system according to the invention further includes a liquid tank 13, a valve 14, and a valve control device 15. As seen in FIG. 1, a first heat pipe section 10a interconnects the opening 11a of the evaporator 11 and the inlet 12a of the condenser 12, a second heat pipe section 10b interconnects the outlet 12b of the condenser 12 and the upper inlet 13a of the liquid tank 13, and a third heat pipe section 10c interconnects the bottom outlet 13b of the liquid tank 13 and one end of the first heat pipe section 10a is connected to the opening 11a of the evaporator 11. As is generally known, working fluid used in the closed-loop pipe system 10 is the same fluid as used in the radiator. The valve 14 is disposed in the third heat pipe section 10c to establish or block the flow of working fluid between the liquid tank 13 and the evaporator 11. Preferably, the valve is an electromagnetic valve. The valve 14 is controlled by the valve control device 15 as shown in FIGS. 2A–2C in such a manner that the valve is fully opened when atmospheric temperature or steam temperature in the evaporator 11 becomes less than a predetermined temperature, for example 60° to 80° C. Under the fully open condition of the valve 14, all liquid fluid in the second heat pipe section 10b and the liquid tank 13 is returned to the evaporator 11.

In FIG. 2A, the valve control device 15 includes a temperature sensor 15a for monitoring atmospheric temperature or steam temperature in the evaporator 11, the sensor generating a signal indicating whether or not the monitored temperature is less than a predetermined temperature. The electromagnetic valve 14 is moved to a fully closed position or a fully open position in response to the signal from the temperature sensor 15a. The valve 14 is fully closed when receiving the signal indicating that the monitored temperature is less than the predetermined temperature.

As shown in FIG. 2B, the valve control device 15 may include a built-in delay timer 15b by which the electromagnetic valve is fully opened only after a predetermined time, for instance, 5 minutes after the engine has stopped.

As shown in FIG. 2C, assuming that the electromagnetic valve 14 may be replaced with a mechanical spool valve 15f, the valve control device 15 may include a capillary tube 15c, a temperature detecting chamber 15d connected through the capillary tube 15c to the spool valve 15f, and gas or liquid fluid 15e disposed in the temperature detecting chamber 15d. As clearly seen in FIG. 2C, since the temperature detecting chamber 15d is disposed in such a manner as to be contact with the evaporator 11, fluid pressure in the chamber 15d is changed in accordance with the atmospheric temperature or steam temperature in the evaporator 11. If the atmospheric temperature or steam temperature in the evaporator 11 is lowered, the fluid pressure in the chamber 15d is also lowered. As a result, pressure applied from the chamber 15d through the capillary tube 15c to the bottom surface of the spool valve is also lowered. The valve control device 15 is designed in such a manner that the spool of the spool valve 15f moves downward (as shown in the arrow of FIG. 2C) to a predetermined level as shown in the phantom line of FIG. 2C when the atmospheric temperature or steam temperature in the evaporator 11 is lowered to the predetermined temperature. Therefore, when the temperature of the evaporator 11 is less than the predetermined temperature, the valve 15f is fully opened and as a result all liquid fluid in the second heat pipe section 10b and the liquid tank 13 is introduced through the third heat pipe section 10c to the evaporator 11.

As will be appreciated from the above, according to the first embodiment, when the temperature of the evaporator section of the closed-loop pipe heating system becomes less than a predetermined temperature after the engine has stopped, all liquid fluid in the liquid tank and in the heat pipe section forming the heat pipe system is returned into the evaporator section. In these constructions, since all of the working fluid of the closed-loop pipe heating system converges in the evaporator disposed in the exhaust pipe when the engine is restarted, the closed-loop pipe heating system will operate efficiently even during winter days when the ambient temperature is particularly low and working fluid in the closed-loop pipe heating system would tend to freeze. Even though the working fluid of the closed-loop pipe heating system may freeze in the evaporator, the frozen fluid is efficiently melt by exhaust heat and thus the system may be easily restart in a relatively short time. Discharge air from the blower is then efficiently fed through the heater core, the condenser section of the closed-loop pipe heating system, and the discharge outlet 16 into the vehicular cabin, in that order. Traditionally, the closed-loop pipe heating system 10 is arranged such that the mounting heights of its respective components are situated gradually lower than the condenser 12. That is to say, the second heat pipe section 10b, the liquid tank 13, the third heat pipe section 10c to the evaporator 11, in that order, are each mounted progressively lower than the preceding component to provide smooth liquid flow through the system.

Second Embodiment

Figure 3:
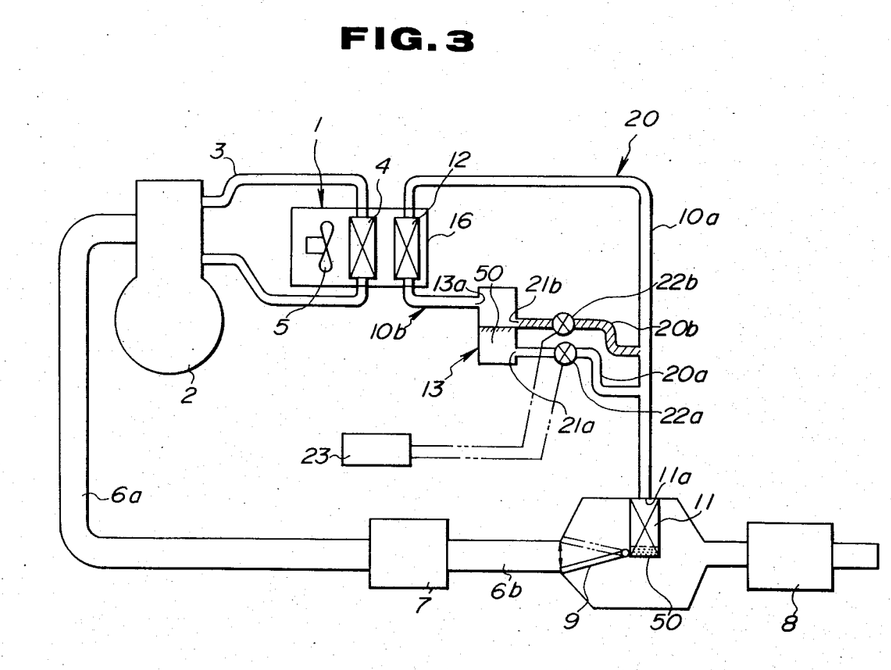
FIG. 3 is a system diagram illustrating the main components of a heating system for automotive vehicles of a second embodiment according to the invention.

As shown in FIG. 3, the construction of the heating system of the second embodiment is similar to the first embodiment. However, the second embodiment is different from the first embodiment in that two juxtaposed return heat pipe sections 20a and 20b, which employ respectively first and second valve means 22a and 22b, each interconnect the liquid tank 13 and the first heat pipe section 10a so as to also intercommunicate the liquid tank 13 and the evaporator 11. The return heat pipe section 20a will be hereinafter referred to as a "first return heat pipe section", while the return heat pipe section 20b will be hereinafter referred to as a "second return heat pipe section". Each of the valve means 22a and 22b may preferably be electromagnetic valves which are designed in such a manner as to be normally closed by means of a spring and to be fully opened only when its electromagnetic coil is excited. Note that one end of the second return heat pipe section 20b is connected to an outlet 21b provided substantially in the center of the side wall of the liquid tank 13, higher than a lower outlet 21a provided in the vicinity of the bottom of the liquid tank 13 and connected to one end of the first return heat pipe section 20a. In this construction, if the first valve 22a is fully opened, most of the liquid fluid 50 in the liquid tank 13 is fed through the lower outlet 21a, the first return heat pipe section 20a, and the opening 11a to the evaporator 11, in that order. Therefore, when the first valve 22a is fully opened, a liquid fluid flow to the evaporator 11 is maintained at a relatively large volume. Conversely, when the first valve 22a is fully closed and the second valve 22b is fully opened, most of the liquid fluid 50 in the liquid tank 13 is not fed to the evaporator 11 but only the liquid reaching to the level of the center outlet 21b of the liquid tank 13 is introduced through the center outlet 21b, the second return heat pipe section 20b, and the opening 11a to the evaporator 11. Due to the delay time until the water level of the liquid tank 13 reaches the level of the center outlet 21b, liquid fluid flow to the evaporator 11 is maintained at a relatively small volume.

As set forth above, the closed-loop pipe system 20 of the second embodiment is capable of providing two different liquid fluid flows to the evaporator 11 by alternately switching the two valves 22a and 22b. In other words, the closed-loop pipe heating system 20 may operate in two modes, namely a first mode wherein a relatively large amount of heat is transmitted to the air flowing through the condenser 12 (i.e. a relatively large flow of steam is supplied from the evaporator 11 to the condenser 12), and a second mode wherein a relatively small amount of heat is transmitted to air flowing through the condenser 12 (i.e. a relatively small flow of steam is supplied from the evaporator 11 to the condenser 12). Thus, the discharge air temperature from the discharge outlet 16 is optimally controllable by the previously noted valve control.

Figure 4:
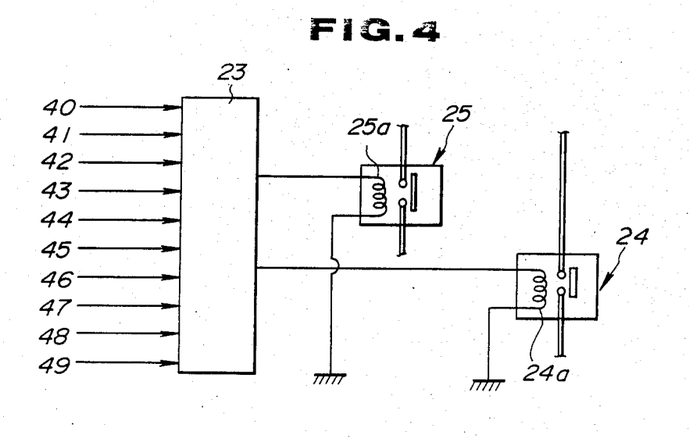
FIG. 4 is a block diagram illustrating the preferred embodiment of a valve control system for the closed-loop heat pipe of the heating system of the second embodiment.

The above mentioned two valves 22a and 22b are controlled by a controller 23 as shown in FIG. 4. The controller 23 receives signals from various sensors and outputs command signals to two electromagnetic relays 24 and 25, respectively connected to the first and second electromagnetic valves 22a and 22b. Preferably, these sensors include; an exhaust gas temperature sensor for generating an exhaust gas temperature signal 40 indicative of the temperature of the exhaust gas flowing through the exhaust pipe 6a, a steam temperature sensor for generating a steam temperature signal 41 indicative of the steam temperature in the heat pipe or the atmospheric temperature in the evaporator 11, a discharge air temperature sensor for generating a discharge air temperature signal 42 indicative of the temperature of the air being discharged from the discharge outlet 16, an engine coolant temperature sensor for generating an engine coolant temperature signal 43 indicative of the engine coolant temperature in the vicinity of the outlet of the engine cooling jacket, a steam pressure sensor for generating a steam pressure signal 44 indicative of the steam pressure in the heat pipe, a fluid volume sensor for generating a working fluid volume signal 45 indicative of the volume of working fluid in the evaporator 11, a steam flow sensor for generating a steam flow signal 46 indicative of the circulation of steam in the heat pipe, a throttle opening angle sensor for generating a throttle valve opening angle signal 47 indicative of the opening angle of the throttle valve, a water temperature sensor for generating a water temperature signal 48 indicative of the water temperature in the outlet of the heater core 4, and a surface temperature sensor for generating a surface temperature signal 49 indicative of the external surface temperature of the heater core 4. The controller 23 receives the signals 40, 41, 42, 43, 44, 45, 46, 47, 48, and/or 49, which continuously vary, depending upon the operating state of the engine 2 and environmental conditions of the vehicle, and determines whether the first valve 22a and/or the second valve 22b are fully opened. When the controller 23 determines that the first valve 22a must be fully open, the controller 23 outputs a command signal to the coil 24a of the relay 24, and therefore the relay 24 assumes an ON state. As a result, the first valve 22a is activated and fully opened. Similarly, when the controller 23 determines that the second valve 22b must be fully open, the controller 23 outputs a command signal to the coil 25a of the relay 25 and therefore the relay 25 assumes an ON state and thereafter the second valve 22b is activated and fully opened.

The closed-loop pipe heating system of the second embodiment, operates as follows.

When the heating system is changed from the OFF state to the ON state by a heating system switch (not shown) provided in the vehicular cabin, just after the engine is started, the controller 23 determines in response to the previously described signals and a signal from the heating system switch that the first valve 22a must be fully open and thereafter outputs the command signal to the relay 24. As a result, the first valve 22a is fully opened and while the second valve 22b remains fully closed, i.e. the pipe heating system 20 operates in the first mode, and therefore most of the liquid fluid in the liquid tank 13 is introduced into the evaporator 11 to be evaporated in the evaporator 11 by exhaust heat. Thus, a large amount of heat is rapidly transmitted to the air flowing through the condenser 12, thereby resulting in quick provision of optimally hot air from the discharge outlet 16 in the vehicular cabin in a relatively short time. On the other hand, the temperature of the engine coolant circulating in the main heating system including the heater core 4 is insufficiently hot for cabin heating requirements and warms gradually. As s result a large amount of heat is gradually transmitted from both the main heating system including the heter core 4 and the auxiliary heating system including the closed-loop heat pipe to the air flowing into the vehicular cabin through the discharge outlet 16. As a result, there is a possibility that overheating will occur in the vehicle cabin. Under this condition, the controller 23 controls the two valves 22a and 22b to change the closed-loop pipe heating system 20 from the first mode to the second mode in response to previously noted signals. In the second mode, the first valve 22a is fully closed and while the second valve 22b is fully opened. Thus, the amount of heat transmitted from the condenser 12 of the closed-loop pipe heating system 20 is reduced, thereby resulting in optimum air temperature from the discharge outlet 16.

When the temperature in the vehicular cabin rises such that a cabin occupant would feel hot, the heating system may be changed from the ON state to the OFF state via the previously described heating switch (not shown), additionally, as soon as the engine is stopped, the heating system automatically assumes the OFF state.

At a time when the heating system becomes OFF, the controller 23 further controls the two valves such that the first valve 22a remains fully closed and the second valve 22b is also fully closed, that is the two valves are operated in a third mode wherein both valves are fully closed by the controller 23. As a result, the relatively small amount of liquid flow from the liquid tank 13 to the evaporator 11 is rapidly cut off and therefore only a slight amount of residual liquid remains in the evaporator and this is rapidly transitted from a liquid state to steam. In this manner, heat-transfer from steam in the condenser 12 of the closed-loop pipe system 20 to air flowing through the condenser is decreased in an extremely short time. Assuming that the liquid volume of working fluid supplied to the evaporator 11 is 50 cc/min and the evaporator 11 can evaporates a liquid working fluid volume of 100 cc/min, all residual liquid in the evaporator 11 will be evaporated within 30 sec of the system being stopped. Therefore, even if a slight amount of residual liquid is left in the evaporator 11, this is evaporated in a short time, thereby preventing steam pressure and/or temperature build-up in the closed-loop pipe heating system from rising excessively.

Upon the engine being stopped and the heating system consequently being stopped, both of the valves 22a and 22b are fully closed by the controller 23, and, as set forth above, heat-transfer from steam in the condenser 12 of the closed-loop pipe heating system 20 to air flowing through the condenser 12 is stopped in a relatively short time. Additionally, according to the elapse of time after the engine is stopped, the atmospheric temperature or steam temperature in the evaporator 11 decreases. When the atmospheric temperature or steam temperature in the evaporator 11 drops to a temperature at which liquid working fluid in the evaporator 11 does not evaporate, the controller 23 outputs a command signal to the first valve 22a in response to the steam temperature signal 41 from the steam temperature sensor. As a result, the first valve 22a is fully opened and thereafter all of the liquid fluid in the liquid tank 13 is introduced into the evaporator 11. As previously described in the first embodiment, restarting of the heating system is smoothly executed, because liquid fluid in the evaporator 11 disposed in the exhaust pipe is easily and efficiently heated by exhaust heat from exhaust gas flowing through the exhaust pipe.

Third Embodiment

Figure 5:
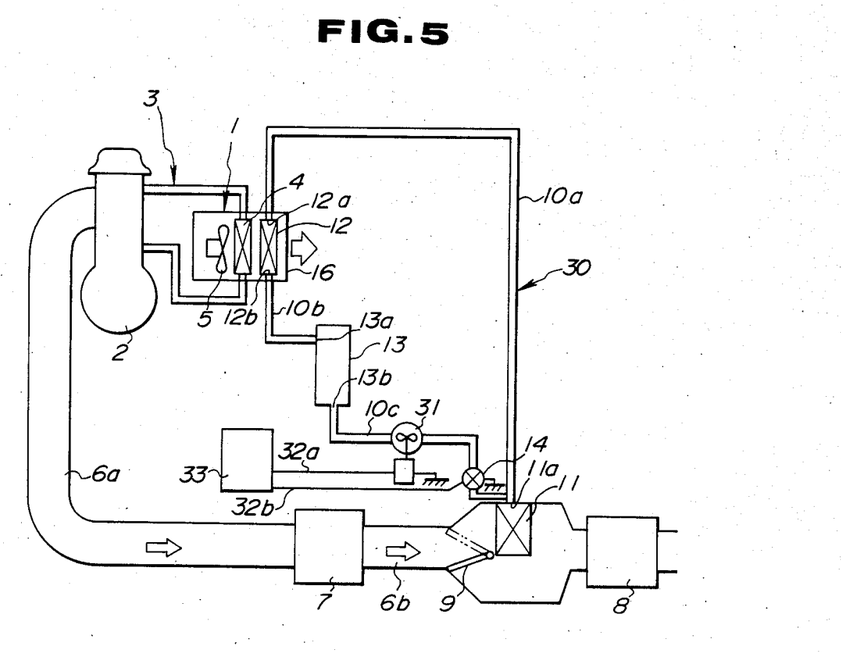
FIG. 5 is a system diagram illustrating the main components of a heating system for automotive vehicles of a third embodiment according to the invention.

As shown in FIG. 5, the construction of the heating system of the third embodiment is similar to the first embodiment. The third embodiment is different from the first embodiment in that a pump 31 is disposed in the third heat pipe section 10c, upstream of the valve 14 so as to control liquid flow from the liquid tank 13 to the evaporator 11. The pump 31 and the valve 14 are respectively connected through lines 32a and 32b to a controller 33. The controller 33 is similar to the controller 23 as described in the second embodiment. The controller 33 controls the pump 31 and the valve 14 in response to signals 41–49 as described in the second embodiment. When quick heating is required just after the engine is started and the heating system is changed from the OFF state to the ON state, the controller 33 controls the valve 14 and the pump 31 such that the valve 14 is fully opened and the pump 31 is operated at a maximum displacement. Subsequently, the controller 33 controls the pump 31 such that the displacement of the pump 31 is gradually reduced according to the elapse of time, to prevent the possibility of the discharge air temperature rising excessively due to being overheated by both the closed-loop pipe heating system and the temperature-rise of engine coolant in the heater core 4. For this reason, the pump 31 may preferably be a variable displacement pump. Furthermore, the pump 31 may be intermittently operated by the controller 33. Moreover, the opening angle of the valve 14 may be changed by the controller 33 so as to control the liquid flow to the evaporator 11. When the vehicular cabin temperature becomes sufficiently hot and the heating system is changed from the ON state to the OFF state, the controller 33 outputs command signals to the valve 14 and the pump 31 and, as a result, the valve 14 is fully closed and the pump 31 is stopped. Thus, the amount of liquid to the evaporator 11 is controlled so as to be evaporated by the evaporator 11 in a relatively short time, thereby preventing excessive steam temperature and pressure build-up in the closed-loop heating pipe. In the third embodiment, when the atmospheric temperature or steam temperature in the evaporator 11 drops to a temperature at which liquid working fluid in the evaporator 11 does not evaporate, the controller 33 outputs command signals to the valve 14 and the pump 31 such that the valve is fully opened and the pump 31 is activated. In this manner, when the engine, and consequently the heating system, is stopped and the atmospheric temperature or steam temperature in the evaporator 11 drops to the predetermined temperature, all of the liquid fluid in the liquid tank 13 and in the heat pipe sections converges in the evaporator 11, thereby resulting in an easy restarting of the heating system.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A heating system for automotive vehicles comprising:
   a heater core connected to a fluid supplied cooling jacket of an engine through an intake fluid passage for introducing coolant from the engine cooling jacket to the heater core and a return fluid passage for returning the engine coolant from the heater core to the cooling jacket;
   a blower disposed upstream of said heater core, for providing air flowing through said heater core;
   a closed-loop pipe heating system comprising;
   an evaporator section disposed in an exhaust passage for exhaust gas, for utilizing a portion of heat included in the exhaust gas;
   a condenser section disposed downstream of said heater core, for transmitting said portion of exhaust heat to the air flowing through said heater core;
   pipe means including a pipe section defining a first fluid passage from said evaporator section to said condenser section and a return pipe section defining a second fluid passage from said condenser section to said evaporator section;
   working fluid means circulating in said closed-loop pipe heating system, for transmitting said portion of exhaust heat from said evaporator section to said condenser section;
   valve means disposed in said return pipe section, for establishing or blocking flow of said working fluid means flowing through said second fluid passage; and
   valve control means associated with said valve means in such a manner as to fully open said valve means when atmospheric temperature in said evaporator section is less than a predetermined temperature at which said working fluid means in said evaporator section transits from a liquid state to a gaseous state.

2. The heating system as set forth in claim 1, wherein said working fluid means comprises the same fluid as said engine coolant.

3. The heating system as set forth in claim 1, wherein said valve means includes an electromagnetic valve.

4. The heating system as set forth in claim 3, wherein said valve control means includes a temperature sensor for monitoring atmospheric temperature in said evaporator section, outputting a signal to said electromagnetic valve indicating whether or not the monitored temperature is less than the predetermined temperature.

5. The heating system as set forth in claim 3, wherein said valve control means includes a built-in delay timer by which said electromagnetic valve is fully opened just after a predetermined time has elapsed after the vehicle engine has stopped.

6. The heating system as set forth in claim 1, wherein said valve means includes a mechanical spool valve and said valve control means includes a capillary tube, a temperature detecting chamber connected through the capillary tube to the spool valve, disposed in such a manner as to be in contact with said evaporator section, and with any gas or liquid fluid disposed in the temperature detecting chamber, whereby the spool valve fully opens when the atmospheric temperature is less than the predetermined temperature.

7. A heating system for automotive vehicles comprising:
   a heater core connected to a fluid supplied cooling jacket of an engine through an intake fluid passage for introducing coolant from the engine cooling jacket to the heater core and a return fluid passage for returning the engine coolant from the heater core to the cooling jacket;
   a blower disposed upstream of said heater core, for providing air flow through said heater core;
   a closed-loop pipe heating system comprising;
   an evaporator section disposed in an exhaust passage for exhaust gas, for utilizing a portion of heat included in the exhaust gas;
   a condenser section disposed downstream of said heater core, for transmitting said portion of exhaust heat to the air flowing through said heater core;
   a liquid tank disposed downstream of said condenser section, between said condenser and evaporator sections;
   pipe means including a pipe section defining a first fluid passage from said evaporator section to said condenser section and a return pipe section defining a second fluid passage from said condenser section to said evaporator section;
   said return pipe section including a pipe section intercommunicating said condenser section and said liquid tank and, first and second return pipe sections each intercommunicating said liquid tank and said evaporator, one end of said second return pipe section being arranged on the side wall of said liquid tank in a position higher than one end of said first return pipe section;
   working fluid means circulating in said closed-loop pipe heating system, for transmitting said portion of exhaust heat from said evaporator section to said condenser section;
   first valve means disposed in said first return pipe section, for establishing or blocking flow of said working fluid means through said first return pipe section;
   second valve means disposed in said second return pipe section, for establishing or blocking flow of said working fluid means through said second return pipe section;
   sensor means for monitoring whether or not the closed-loop pipe heating system is required and generating a signal indicative thereof; and
   a controller for controlling said first and second valve means in response to the signal from said sensor means.

8. The heating system as set forth in claim 7, wherein said controller controls said first and second valve means in a first mode wherein said first valve means is fully opened and said second valve means is fully closed when a relatively large amount of heat is required, a second mode wherein said first valve means is fully closed and said second valve means is fully opened when a relatively small amount of heat is required, or a third mode wherein both said first and second valve means are fully closed when no heat is required.

9. The heating system as set forth in claim 8, wherein said sensor means includes sensors for monitoring; temperature of exhaust gas, steam temperature in the pipe section defining said first fluid passage, atmospheric temperature in said evaporator section, temperature of discharge air discharged through said condenser into the vehicular cabin, engine coolant temperature, steam pressure in the pipe section defining said first fluid passage, liquid fluid volume in said evaporator section, steam flow in the pipe section defining said first fluid passage, a throttle valve opening angle, fluid temperature in the outlet of said heater core and external surface temperature of said heater core.

10. The heating system as set forth in claim 9, wherein said controller controls said two valve means in such a manner as to fully open said first valve means and to fully close said second valve means when atmospheric temperature in said evaporator section is less than a predetermined temperature at which said working fluid means in said evaporator section transits from a liquid state to a gaseous state.

11. The heating system as set forth in claim 7, wherein said working fluid means comprises the same fluid as said engine coolant.

12. The heating system as set forth in claim 7, wherein each of said first and second valve means includes an electromagnetic valve.

13. A heating system for automotive vehicles comprising:
   a heater core connected to a fluid supplied cooling jacket of an engine through an intake fluid passage for introducing coolant from the engine cooling jacket to the heater core and a return fluid passage for returning the engine coolant from the heater core to the cooling jacket;
   a blower disposed upstream of said heater core, for providing air flow through said heater core;
   a closed-loop pipe heating system comprising;
   an evaporator section disposed in an exhaust passage for exhaust gas, for utilizing a portion of heat included in the exhaust gas;
   a condenser section disposed downstream of said heater core, for transmitting said portion of exhaust heat to the air flowing through said heater core;
   pipe means including a pipe section defining a first fluid passage from said evaporator section to said condenser section and a return pipe section defining a second fluid passage from said condenser section to said evaporator section;
   working fluid means circulating in a fluid passage defined in said evaporator section and said condenser section, and said first and second fluid passages, for transmitting said portion of exhaust heat from said evaporator section to said condenser section;
   sensor means for monitoring whether or not the closed-loop pipe heating system is required and generating a signal indicative thereof; and
   flow control means disposed in said second fluid passage, for controlling flow of said working fluid means from said condenser section to said evaporator section, in response to the signal from said sensor means.

14. The heating system as set forth in claim 13, wherein said flow control means includes;
   valve means disposed in said return pipe section, for establishing or blocking flow of said working fluid means flowing through said second fluid passage;
   pump means disposed in said return pipe section in line with said valve means, for discharging said working fluid means from said condenser section through said second fluid passage to said evaporator section; and
   a controller for controlling said valve means and said pump means in response to the signal from said sensor means.

15. The heating system as set forth in claim 14, wherein said valve means includes an electromagnetic valve and said pump means includes a variable displacement pump.

16. The heating system as set forth in claim 14, wherein said valve means includes a flow control valve in which the opening angle of the valve is variable.

17. The heating system as set forth in claim 13, wherein said flow control means operates in such a manner as to provide a maximum fluid flow of said working fluid means from said condenser section through said second fluid passage to said evaporator section when the atmospheric temperature in said evaporator section is less than a predetermined temperature at which said working fluid means in said evaporator section transits from a liquid state to a gaseous state.

18. The heating system as set forth in claim 13, wherein said working fluid means comprises the same fluid as said engine coolant.

19. The heating system as set forth in claim 13, wherein said sensor means includes sensors for monitoring; the temperature of exhaust gas, steam temperature in the pipe section defining said first fluid passage, atmospheric temperature in said evaporator section, temperature of discharge air discharged through said condenser into the vehicular cabin, engine coolant temperature, steam pressure in the pipe section defining said first fluid passage, liquid fluid volume in said evaporator section, steam flow in the pipe section defining said first fluid passage, a throttle valve opening angle, fluid temperature in the outlet of said heater core, and the external surface temperature of said heater core.

* * * * *